(12) United States Patent
Tallot et al.

(10) Patent No.: US 8,918,291 B2
(45) Date of Patent: Dec. 23, 2014

(54) METHOD FOR MONITORING A NO-BACK DEVICE OF AN ADJUSTABLE HORIZONTAL TRIM ACTUATOR, CORRESPONDING SYSTEM AND AIRCRAFT

(75) Inventors: Cedric Tallot, Montauban (FR); Laura Baxerres, Toulouse (FR); Ivan Ferreol, Blagnac (FR)

(73) Assignee: Airbus Operation S.A.S., Toulouse (FR)

( * ) Notice: Subject to any disclaimer, the term of this patent is extended or adjusted under 35 U.S.C. 154(b) by 749 days.

(21) Appl. No.: 12/888,965

(22) Filed: Sep. 23, 2010

(65) Prior Publication Data

US 2011/0127375 A1 Jun. 2, 2011

(30) Foreign Application Priority Data

Nov. 27, 2009 (FR) ...................................... 09 58460

(51) Int. Cl.
| | |
|---|---|
| *B64D 45/00* | (2006.01) |
| *B64C 5/10* | (2006.01) |
| *B64C 13/24* | (2006.01) |
| *B64C 13/28* | (2006.01) |
| *F16H 25/20* | (2006.01) |

(52) U.S. Cl.
CPC . *B64D 45/00* (2013.01); *B64C 5/10* (2013.01); *B64C 13/24* (2013.01); *B64C 13/28* (2013.01); *B64D 2045/0085* (2013.01); *F16H 25/2021* (2013.01)
USPC .......................................................... 702/34

(58) Field of Classification Search
CPC .. B64D 45/00; B64D 2045/0085; B64C 5/10; B64C 13/24; B64C 13/28; F16H 25/2021
USPC .......................................................... 702/34
See application file for complete search history.

(56) References Cited

U.S. PATENT DOCUMENTS

| | | | |
|---|---|---|---|
| 4,441,675 A | 4/1984 | Boehringer et al. | |
| 7,293,524 B2 * | 11/2007 | Darby ........................... | 116/281 |

(Continued)

FOREIGN PATENT DOCUMENTS

| | | |
|---|---|---|
| EP | 0 960 811 A2 | 12/1999 |
| EP | 0 960 811 A3 | 12/1999 |

(Continued)

OTHER PUBLICATIONS

Johnson, J. L. "Introduction to Fluid Power." Delmar Thomas Learning, 2002. pp. 61, 66.*

(Continued)

*Primary Examiner* — Jonathan C Teixeira Moffat
*Assistant Examiner* — Liam R Casey
(74) *Attorney, Agent, or Firm* — Oblon, Spivak, McClelland, Maier & Neustadt, L.L.P.

(57) ABSTRACT

A method and a system for monitoring an actuator equipped with a no-back device or no-back brake, particularly an adjustable horizontal trim actuator provided in aircraft, the method including the steps of: determining a value representative of mechanical work produced by the actuator and comparing the determined value with ranges of values so as to detect a dysfunctioning of the said no-back device. If the actuator is a screw/nut type with a hydraulic motor, the value representative of the mechanical work is determined from an algebraic velocity of the motor and an algebraic differential of hydraulic pressure at terminals of the motor. A negative value corresponding to negative mechanical work then identifies a failure of the no-back device.

17 Claims, 4 Drawing Sheets

(56) References Cited

U.S. PATENT DOCUMENTS

| | | | |
|---|---|---|---|
| 7,366,590 B2* | 4/2008 | Balasu | 701/3 |
| 2003/0051950 A1* | 3/2003 | Harvey | 188/134 |
| 2008/0000730 A1* | 1/2008 | Port-Robach et al. | 188/71.2 |

FOREIGN PATENT DOCUMENTS

| | | |
|---|---|---|
| EP | 1 245 867 A2 | 10/2002 |
| EP | 1 245 867 A3 | 10/2002 |
| EP | 1 640 265 A1 | 3/2006 |
| EP | 1 669 624 A1 | 6/2006 |
| WO | WO 97/43557 | 11/1997 |

OTHER PUBLICATIONS

Beard, S. D. "Turnaround Bump Reduction in a Linear Hydraulic Actuator by Mechanical Means," AIAA Modeling and Simulation Technologies Conference and Exhibit, Aug. 16-19, 2004.*

* cited by examiner

METHOD FOR MONITORING A NO-BACK DEVICE OF AN ADJUSTABLE HORIZONTAL TRIM ACTUATOR, CORRESPONDING SYSTEM AND AIRCRAFT

This application claims priority from French patent application No. 09 58460 of Nov. 27, 2009 which is incorporated herein by reference.

FIELD OF THE INVENTION

The present invention relates to a method and a system for monitoring of an actuator equipped with a no-back device and in particular an adjustable horizontal trim actuator provided in aircraft.

BACKGROUND OF THE INVENTION

Modern commercial airplanes are equipped with a horizontal stabilizer tailplane whose inclination is adjustable. Such an adjustable horizontal tailplane is known in the art by one or the other of the abbreviations PHR (for Plan Horizontal Réglable [Adjustable Horizontal Trim] or THS (for "Trimmable Horizontal Stabilizer"). An actuator, controlled automatically during a normal flight in manual mode or under automatic pilot, or controlled manually by the pilot via a control provided in the cockpit in the case of operations on the ground or under fault conditions, permits adjustment of the inclination of the tailplane.

Several types of actuators were able to be provided in the art, such as the hydraulic actuator described in document WO 2007/028597.

In document EP 0983937, a traditional adjustable horizontal trim actuator is of the ballscrew/nut type ("ball screw/nut"), which offers good mechanical operating efficiency.

This screw/nut assembly achieves the mechanical linkage of variable length between the fixed structure of the airplane (the screw is connected to the fuselage by a ball-joint linkage) and the horizontal tailplane (integral with the nut). The rotation of the screw by a motor and associated gears causes translation of the nut and thus tilting of the horizontal tailplane around a horizontal axis of rotation, in one direction or the other depending on the inputs applied to the motor.

The objective of adjustment of the tailplane is to compensate for possible aerodynamic loads applied to this horizontal tailplane in order to guarantee the desired trajectory of the airplane while preventing the pilot from having to apply a compensating force continuously on the associated controls. In particular, this compensation is effected automatically by the flight control system.

The actuators are subjected to an aerodynamic load resulting from the distribution of loads in the airplane, from the trajectory of the latter and from the flight conditions. Thus, as illustrated by FIG. 1, this aerodynamic load F is transmitted, in our example, to the nut and then to screw 12 by way of balls. F is resolved into an axial component Fy and a radial component Fx.

The latter, Fx, causes progressive and undesired rotation of screw 12, which over time leads to a variation of the inclination of the horizontal tailplane and therefore of the trajectory of the airplane. The pilot must then readjust the displaced tailplane manually and frequently.

In order to avoid such an involuntary variation and to guarantee effective control of the adjustable horizontal trim, a no-back function of the actuator is provided.

In the case of an actuator of the screw/nut type, this function is assured by a no-back device, also known as "anti-return device", "brake with anti-displacement system" or "no-back brake". This no-back device is integrated in the actuator and may be redundantly designed, as shown in document EP 0983937.

More generally, an electromechanical actuator (EMA) may be equipped with a no-back device, such as with the monitoring device of document EP 1245867.

In connection with an analysis of airplane safety, the integrity of the no-back function of the THS actuators (or "THSA") is verified.

At present, this verification of the integrity of the "no-back brake" device is achieved by periodic operational tests on the airplane, particularly on the THS actuator.

In fact, because this no-back device is integrated in the actuator, a functional test aimed at directly verifying the integrity of the no-back function of the actuator is not conceivable. It is therefore necessary to resort to a substantially subjective operational test.

The test is based on characteristics specific to the no-back device, and consists, for an operator, in listening, during startup of the system by means of an input and of force applied to the horizontal tailplane, for a specific and repetitive "tick-tick" noise, which is normally emitted by the device during operation.

In addition to the subjective and therefore poorly robust nature of this test, other disadvantages of this test exist:

it is laborious, because it requires several operators simultaneously and a long downtime for the airplane;

consequently, it is performed infrequently (after several hundred or thousands of flying hours): a failure may therefore remain concealed during the interval between two successive tests. In the safety analysis of the airplane, this low frequency is compensated for by weighting of the hypothetical failure rate of the brake device. On this basis a statistical breakdown of the probability of failure of the device is obtained;

it covers a limited range of possible failures, while other failure modes are not detectable by the "tick-tick" test. The failures of these other modes then tend to remain concealed during the lifetime of the airplane.

SUMMARY OF THE INVENTION

The purpose of the present invention is to alleviate at least one of these disadvantages in order to improve the detection of failure of a no-back device, to reduce the activities of periodic tests and/or to improve the availability of the airplane.

With this intention the invention also relates to a method for monitoring of an actuator equipped with a no-back device, comprising the steps consisting in:

determining a value representative of the mechanical work produced by the said actuator, comparing the said determined value with ranges of values so as to detect dysfunctioning of the said no-back device.

By "mechanical work" there is understood the energy produced by the actuator in order to ensure equilibration of the horizontal tailplane.

The steps according to the invention may be performed easily in continuous manner, on the ground and/or during flight, such that an improvement of the detection of a fault of the no-back device is achieved.

The invention is based on the principle that, during normal operation, the mechanical work furnished by the actuator equipped with an operational no-back device for achieving slaving of the tailplane in horizontal trim position is positive, and that this is the case regardless of the nature of the aerodynamic load on the tailplane.

On the other hand, in the case of loss of the no-back function of the no-back device, the algebraic sign of the mechanical work depends on the nature of the aerodynamic load to which the tailplane is subjected. For an "aiding" aerodynamic load (the resisting force of the actuator would result in a movement of the tailplane in the same direction as that of the aerodynamic force to which it is subjected), the actuator furnishes negative work, whereas for a "resisting" aerodynamic load (the resisting force of the actuator would result in a movement of the tailplane in the direction opposite to that of the aerodynamic force to which it is subjected), slaving of the trim requires positive work of the actuator.

Thus the detection of work, especially negative, makes it possible to detect a fault of the no-back device.

Furthermore, the method according to the invention proves robust, because the analysis of work cycles of the actuator shows that, in each flight, operations under "aiding" aerodynamic load and operations under "resisting" aerodynamic load are systematically encountered. Thus, during a flight with a faulty no-back device, it is assured that a zone of operation in negative work will be encountered and that this fault will therefore be detected by continuous measurement. In this way the maximum period during which a possible fault remains concealed is reduced to the duration of the flight.

In one embodiment of the invention, the said actuator comprises a screw/nut assembly driven by a motor, and the said determination of a value representative of the mechanical work comprises the measurement of at least one physical value relating to the said motor. This implementation makes it possible to obtain the algebraic value of the mechanical work of the actuator from physical values, for example inputs, applied to the motor driving the actuator.

In particular, the actuator comprises a motor having a hydraulic channel, and the said value representative of the mechanical work is determined from an algebraic velocity of the said motor and an algebraic difference of hydraulic pressure at the terminals of the said motor. The motor velocity is in particular the angular velocity of the shaft of the electric motor.

Other types of motor may also be provided, such as electric motors, in which case other physical values are measured and taken into account in the determination of the mechanical work, for example the electrical voltage and current at the terminals of the motor.

In one embodiment, the detection of the dysfunctioning is a function of the algebraic sign of the said value representative of the determined mechanical work. On the basis of the principle alluded to above, this embodiment has the advantage of being extremely simple to employ and it permits effective detection of the failure of the "no-back brake" device.

In particular, the dysfunctioning of the said no-back device is detected when the said value representative of the mechanical work is of given sign, for example negative, and at least one physical value relating to the motor has an absolute value greater than a corresponding threshold value. Of course, the given sign is a function of the sign convention adopted for the measured values, which convention may be modified without going beyond the scope of the invention.

In the case of the hydraulic motor, that corresponds to the algebraic difference of hydraulic pressure and to the algebraic velocity, each of which has an absolute value greater than a corresponding threshold value. In the case of the electric motor, the electrical voltage and current may be used.

The purpose of introduction of thresholds is to avoid untimely detection of failures when the actuator is operating with small values (absolute values close to zero). In addition, it makes it possible to alleviate potential uncertainties in the measurements of these values, for example due to calibrations with poor precision or to fluctuations of behavior according to external conditions during the flight (temperature, shock, atmospheric pressure, etc.).

It is understood that, although threshold values for all of the measured physical values are alluded to here, it is possible in the scope of the present invention to apply such threshold values to all or some of these physical values (possibly to one alone).

Furthermore, parameters relating to particular conditions of normal operation of the actuator may be taken into account to inhibit or not inhibit detection of dysfunctioning, because they can potentially lead to untimely detection of failure.

In particular, the detection of dysfunctioning is temporarily inhibited as a function of a parameter relating to reversal of the direction of movement of the said actuator. In fact, in the case of reversal of direction, negative mechanical work may be detected temporarily as a result of the free play (in the sense of the functional space left free between two parts) in the actuator. This device therefore makes it possible to inhibit detection if it results from a "free" movement within the free play of the no-back device of the actuator.

Also, the detection of dysfunctioning is temporarily inhibited as a function of a parameter representative of a rate of deceleration of the said motor. In fact, in the case of a sudden and large deceleration, the "motor brake" effect may cause negative mechanical work. According to this feature, it is therefore provided that cases of use of the "motor brake", the latter generally being determined relative to a threshold decrease of the velocity of the motor during a defined time interval, are excluded from the case of fault.

Furthermore, the detection of dysfunctioning is also inhibited in the case of a failure of one or more of the transducers in charge of measuring the parameters being monitored.

According to one characteristic of the invention, the method comprises a step of indicating a dysfunctioning of the said no-back device when a dysfunctioning of this no-back device is detected for several said consecutive determined values. Such an indication may result in an indicator in the cockpit for the purpose of alerting the pilots, or in a boolean or other information technology datum transmitted to an onboard maintenance computer for the purpose of alerting the maintenance operators of an operation to be performed.

Correlatively, the invention also relates to a system for monitoring an actuator equipped with a no-back device, comprising:
a determination module for determining a value representative of the mechanical work produced by the said actuator;
a comparison module for comparing the said determined value with ranges of values so as to detect a dysfunctioning of the said no-back device.

The monitoring system has characteristics and advantageous analogous to those of the monitoring method according to the invention.

Optionally, the system may comprise means relating to the characteristics of the method explained in the foregoing.

The invention also relates to an aircraft comprising an actuator equipped with a no-back device and a system for monitoring the said actuator such as presented above.

BRIEF DESCRIPTION OF THE DRAWINGS

Other features and advantages of the invention will become more apparent in the description below, illustrated by the attached drawings, wherein.

DETAILED DESCRIPTION OF EMBODIMENTS OF THE INVENTION

Figure 1:
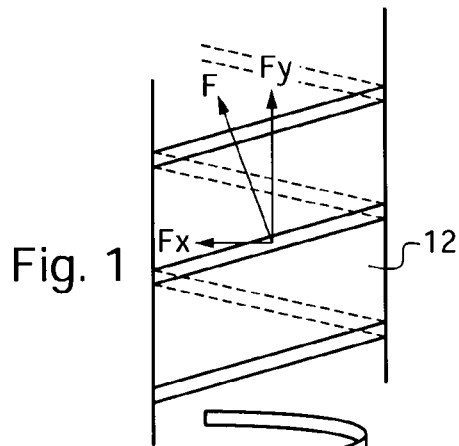
FIG. 1 illustrates the effect of an aerodynamic load on an actuator with screw/nut.
Figure 2:
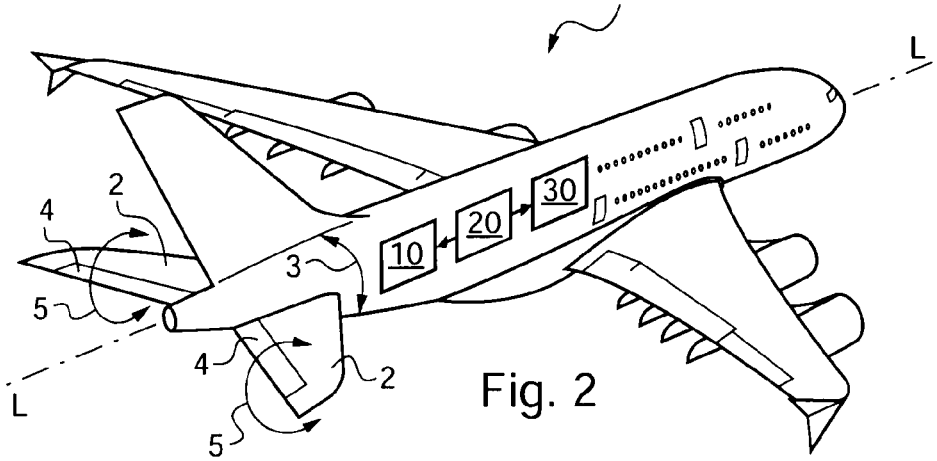
FIG. 2 shows, in schematic perspective, a commercial airplane provided with an adjustable horizontal tailplane.

Airplane 1, shown schematically in FIG. 2, has a longitudinal axis L-L and is provided with a horizontal tailplane 2 whose inclination can be adjusted relative to fuselage 5, as is illustrated by double arrow 3. Horizontal tailplane 2 constitutes an adjustable horizontal trim, whose adjustment is achieved by an actuator 10 controlled in particular by one or more flight control computers 20.

At the rear edge of horizontal tailplane 2 there are flexibly connected elevators 4 capable of turning relative to tailplane 2 for the purpose of making airplane 1 pull up or dive depending on the phase of flight.

In a manner known in itself, airplane 1 also comprises an on-board maintenance computer 30, which receives from flight computers 20 all of the information items, especially faults, relating to future maintenance to be performed.

Figure 3:
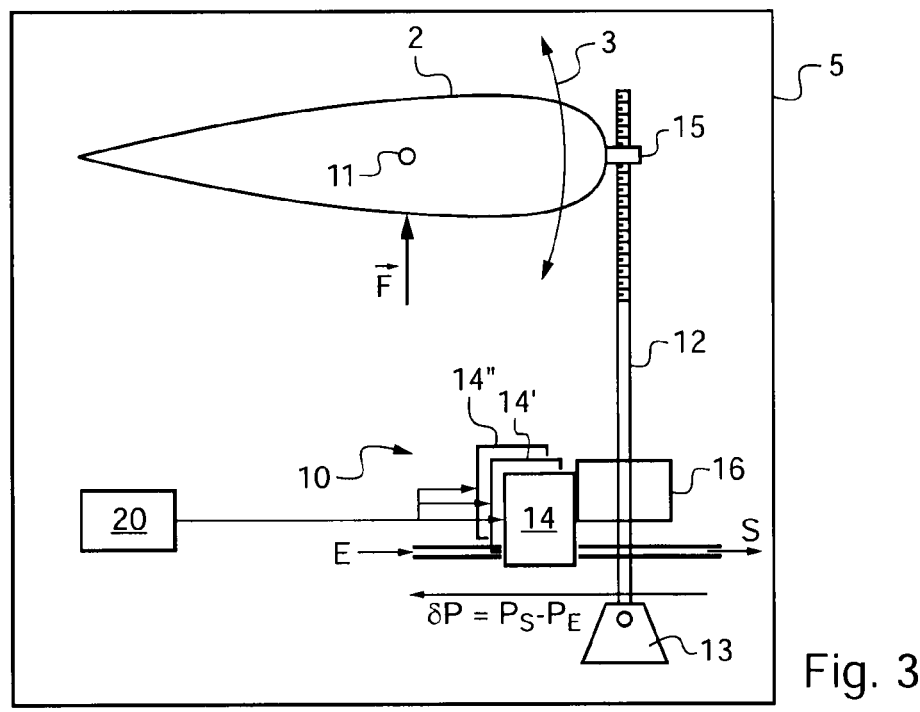
FIG. 3 schematically shows an airplane fuselage illustrating an adjustable horizontal tailplane equipped with a no-back device.

FIG. 3 schematically shows a horizontal tailplane 2 of airplane 1 and trimmable horizontal stabilizer actuator 10 (THSA).

Horizontal tailplane 2 can be inclined around a horizontal transverse shaft 11 to equilibrate airplane 1 during flight. The inclination is able in particular to provide compensation for the distribution of loads being transported in the airplane.

Actuator 10 comprises a ball screw 12, whose round head is connected to fuselage 5 by a ball-joint linkage, for example via a universal-joint system 13. In particular, screw 12 of actuator 10 may be connected to the upper part of the rear fuselage of airplane 1.

Screw 12 may be caused to turn in one direction or the other by a control mechanism 14, for example a motor and associated gears (the latter not being represented in the figure), itself controlled by a flight computer 20.

A nut 15 integral with tailplane 2 is provided so that screw 12 is engaged therein. When screw 12 is turned, nut 15 becomes displaced along the shaft of screw 12, bringing about inclination of tailplane 2 in one direction or the other depending on the direction of rotation of the screw.

A mechanism 16 of the "no-back brake" or "anti-displacement system brake" type is integrated with actuator 10 in order to furnish a no-back function for the inclination of the tailplane, especially by blocking the rotation of screw 12 by means of a force resisting the rotation of this screw. Such a mechanism is known to the person skilled in the art, as shown in document EP 0983937, and consequently will not be described in more detail in the rest of the description. The invention is applicable in particular to any type of brake mechanism 16.

In non-limitative manner, actuator 10 of FIG. 3 possesses three channels, each permitting slaving of adjustable horizontal trim 2 in position. Two of the three channels are said to be hydraulic, in that they furnish mechanical power for turning screw 12 on the basis of hydraulic power. In the figure, E represents the inlet of the hydraulic flow and S represents the outlet of the same hydraulic flow for motor 14. The difference (or differential) of hydraulic pressure between inlet E and outlet S is represented by $\delta P$. This algebraic pressure differential is measured locally by pressure transducers. Motor 14' is also a hydraulic motor.

The third channel is said to be electrical, in that, when it is activated, it furnishes the mechanical power on the basis of electrical power. This channel is generally an emergency channel. It is represented in the figure by motor 14" of electrical type receiving, at its terminals, an electrical voltage U and an electrical current I. These values may also be measured by equipment items known in the art.

For all of these motors, the algebraic output velocity $V_m$ is measured at the output of the shaft of the motors (angular velocity) by appropriate transducers.

During a phase of flight, horizontal tailplane 2 is subjected to an aerodynamic load (schematically represented here by a single arrow F). Depending on the inclination of tailplane 2 desired by flight computer 20, this aerodynamic component F may have an effect of displacing tailplane 2 in the same direction as the hypothetical displacement thereof under the current action of motor 14 in the absence of no-back device 16. This situation is then referred to as "aiding" aerodynamic load. In this case, the no-back device transforms the "aiding" force into resisting force from the viewpoint of the motor.

The aerodynamic load and the hypothetical displacement may be in opposite directions, in which case the aerodynamic load is referred to as "resisting". The equilibrium between this load and the motor is then natural.

Figure 4:
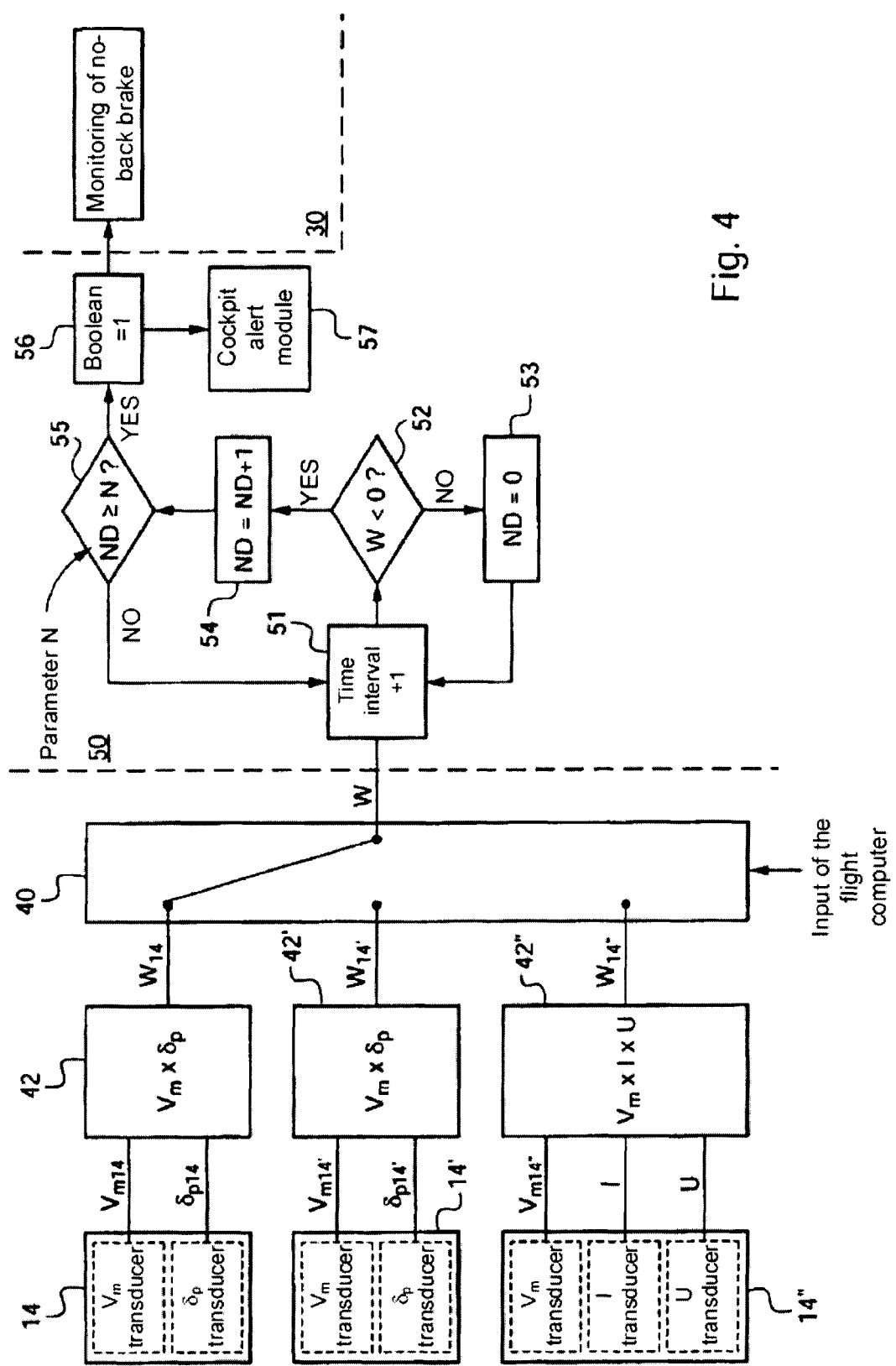
FIG. 4 represents the system for employment of the invention according to a first embodiment.

FIG. 4 details the on-board system for employment of the invention, especially for:

determining a value representative of the mechanical work produced by the actuator;

comparing this determined value with ranges of values so as to detect a dysfunctioning of no-back device 16.

Of the three electric motors present represented—14, 14' (hydraulic) and 14" (electrical)—only one is active at a given instant. Nevertheless, there are cases in which several motors are active simultaneously (for example, double pressurization of the actuator), in which case the invention takes into account the mechanical work of these motors.

It is desired to obtain an algebraic value of the mechanical work furnished by the active motor. Because this latter value is not a directly available datum, it is deduced from the measurement of other physical values at the terminals of the motors, as follows:

pressure differential $\delta P$ at the terminals of motors 14 and 14';

electrical current I and voltage U for motor 14"; and algebraic velocity Vm for each motor.

These values are acquired periodically by appropriate transducers integrated into each of the hydraulic and mechanical channels. They are algebraic in particular because, as illustrated hereinafter, it is important to know the sign of the mechanical work furnished by the motors.

It will be noted that the active motor is caused to rotate by control of a flight computer 20 during maneuvers, therefore generally during takeoff and landing, although sometimes during some maneuvers in cruising flight.

For certain airplanes, it may be provided that monitoring of no-back device 16 is performed only for the hydraulic channels, in which case no measurement for this purpose is performed on electrical motor 14".

It will be noted that the monitoring associated with a channel is activated only when this channel is itself made active by the flight computers. In the figure, this option is illustrated by way of example by a switch 40 operated by a flight computer and making it possible to route the measured data or data derived therefrom to logic 50 for monitoring the integrity of device 16.

The measured values (Vm and δP for our example) are multiplied together in a multiplication block 42, so as to furnish a value W representative of the mechanical work produced by the corresponding motor. Even if this value is not equal to the mechanical work, it has the same sign as the latter, with an appropriate sign convention.

Figure 5:
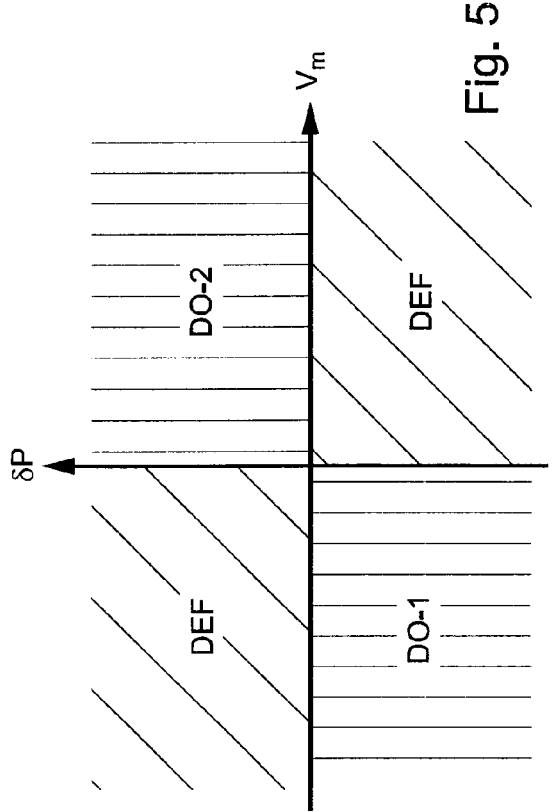
FIG. 5 illustrates the domains of operation of an actuator motor for employment of the invention according to the first embodiment.

This approach makes it possible to establish two theoretical domains of operation of actuator 10, as illustrated in FIG. 5:

an operational domain OP corresponding to an unimpaired "no-back brake" device 16 for which the sign of the mechanical work is positive (a zone DO-1 and a zone DO-2 representing, depending on the adopted conventions, the zones in which the airplane is to be pulled up or put into a dive);

a fault domain DEF, corresponding to a loss of the no-back function.

In flight computer 20 in charge of slaving and control of the hydraulic (and possibly electrical) channels, monitoring logic 50 periodically conducts a verification of the integrity of no-back device 16 on the basis of the performed measurements and therefore of the transmitted value W.

Upon each time interval (each period) incremented by logic 51, the domain OP or DEF in which the actuator is operating is determined. To achieve this, block 52 determines the sign of W: if it is negative, actuator 10 is operating in domain DEF; if it is positive, the actuator is operating in domain OP.

In the latter case, nothing needs to be signaled. The number of successive detections ND is set to 0 (block 53) and the monitoring logic goes to the following instant via block 51.

In the case of detected dysfunctioning (domain DEF), the number of detections ND is incremented by 1 in block 54, then compared (block 55) with a number N set beforehand by the flight computer or by an external operator.

If ND<N, then the monitoring logic goes to the following instant via block 51.

If not, that means that actuator 10 has operated N successive time intervals in failure zone DEF, thus leading to activation of a failure boolean (block 56).

The value N may be adjusted according to the sensitivity desired for monitoring, since it defines a time window for confirmation of the detection of a fault.

The activated boolean is then locked for the remaining duration of the flight. It may be transmitted to an alert module 57 provided in the cockpit in order to warn the pilots, either during the flight or at the end of the flight, of the fault of the no-back device with which the horizontal tailplane actuator is equipped.

It is also transmitted to maintenance computer 30 together with a failure message, in order to permit the operators on the ground to proceed effectively with an operation for repair or replacement of the suspect no-back device.

It will be noted that the production of the boolean may permit flight computer 20 to change the active hydraulic/electrical channel, for example by commanding the associated motor and by operating switch 40 in appropriate manner.

Of course, the boolean is re-initialized after the maintenance operation, meaning, in particular, before the next flight. In this way it is observed that the mechanism for monitoring the no-back device according to the invention permits regular control of the integrity of this device, since the interval between two verifications does not exceed the duration of one flight. This results in an improvement of the probability that failure of the device will be taken into account in the airplane safety analysis.

Furthermore, the failure diagnosis is immediately available, via the boolean, as soon as the airplane is on the ground. In this way downtime of the airplane for purposes of conducting appropriate operational tests is avoided.

It is also observed that all failures leading to non-functioning of the no-back device are detected, without distinction of some from others, since the detection is oriented toward the absence of no-back function, or in other words the absence of the anti-return brake. In this way the subjectivity of an operator has no influence.

Figure 6:
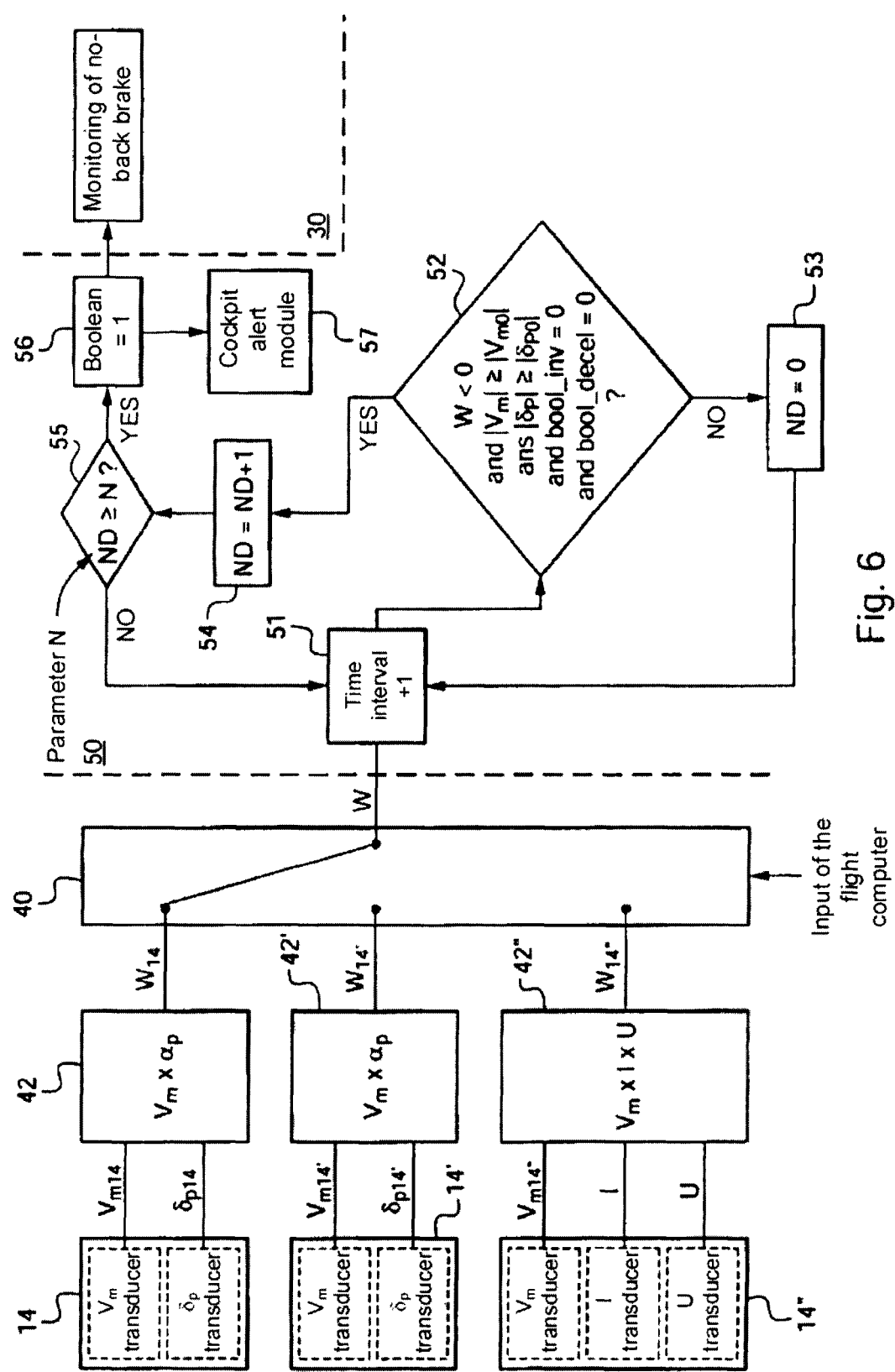
FIG. 6 represents the system for employment of the invention according to a second embodiment.

FIG. 6 shows a second embodiment that reduces the risks of untimely detection of a fault. This embodiment is similar to the embodiment of FIG. 4, with the exception of conditions (block 52) leading to detection of dysfunctioning of no-back device 16.

In addition to the condition pertaining to the sign of value W calculated in 42, other conditions are taken into account, in non-limitative manner:

$|V_m| \geq V_{m0}$: the absolute amplitude of the measured velocity of the motor is greater than a threshold value $V_{m0}$ relating to a global uncertainty of the measurement of the speed of the motor;

$|\delta P| \geq \delta P_0$: the absolute amplitude of the pressure differential measured at the terminals of the motor is greater than a threshold value $\delta P_0$ relating to a global uncertainty of the measurement of the differential pressure at the terminals of the motor;

bool_inv=0: the detection is inhibited under certain conditions of reversal of the direction of rotation of the actuator (bool_inv=1);

bool_decel=0: the detection is inhibited under certain conditions of rapid deceleration of the actuator (bool_decel=1).

Of course, depending on diverse desired degrees of precision, all or part of these supplementary conditions may be employed in the scope of the present invention (absence of these conditions corresponding to the case of FIG. 4).

Furthermore, although a single threshold value for both the measured velocity and the pressure differential is alluded to here (defining three zones: $]-\infty; -V_{m0}]$; $]-V_{m0}; V_{m0}[$ and $[V_{m0}; +\infty[$ in the case of the measured velocity), several threshold values $V_{m1}<0<V_{m2}$ may be provided, for example to define three zones as follows: $]-\infty; -V_{m1}]$; $]V_{m1}; V_{m2}[$ and $[V_{m2}; +\infty[$ (ditto with $\delta P_1 < 0 < \delta P_2$).

Figure 7:
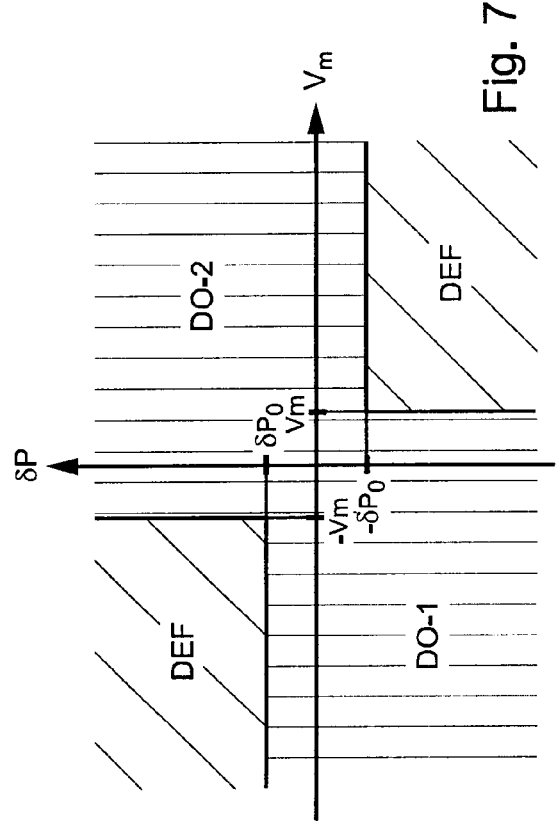
FIG. 7 illustrates the domains of operation of an actuator motor for employment of the invention according to the second embodiment.

As illustrated in FIG. 7, the first two conditions, taken together or separately, reduce the domains of detection of a failure of no-back device 16 by avoiding detection of a failure around axes $V_m=0$ and $\delta P=0$.

In fact, taking measurement uncertainties of the values $V_m$ and $\delta P$ into account, as well as errors resulting from the acquisition and processing of associated signals, there are cases in which the measured values change sign even through motor 14 does not physically exhibit a behavior corresponding to this change of sign. In these cases, untimely detection of failure may occur.

As employed in FIG. 6, these two conditions are incorporated in block 52, making it possible to avoid untimely detection if the measured values are too small in absolute value and therefore likely to change sign in an untimely manner.

The other two conditions are specific to normal operations of the actuator that may also lead to untimely and incorrect detection of a failure of no-back device 16. These two conditions are aimed at the detection of these cases of normal operations and at the inhibition of the detection (boolean set to zero) in these cases, regardless of the operating domain DO or DEF in which actuator 10 is evolving at the time.

Figure 8:
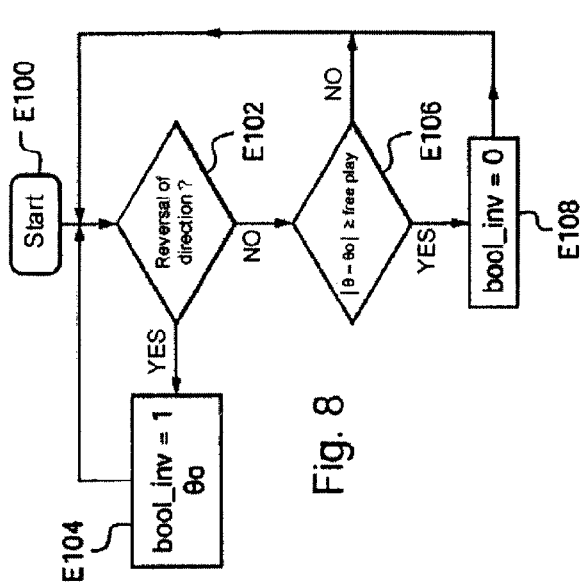
FIG. 8 represents, in the form of a schematic diagram, steps for determining an indicator of reversal of the direction of rotation of the actuator for the second embodiment.

Referring to FIG. 8, the first of the two conditions inhibits the detection as soon as a reversal of the direction of rotation of the motor is detected and as soon as the displacement of the shaft of screw 12, for example, remains within the free play of no-back device 16. In fact, in this case, the free play, by transmission of the radial component through nut 15 and screw 12, permits the aerodynamic load to relax the force on motor 14 and therefore to create, temporarily, negative mechanical work (δP changing sign), even if actuator 10 is operational and no-back device 16 is unimpaired.

A routine for monitoring the direction of rotation of the actuator is provided in monitoring logic 50. This routine is executed in parallel with the processing steps of FIG. 8 and it provides, after a starting step E100, a step of detecting reversal of the direction of rotation of screw 12 (step E102). This detection may be achieved by comparing two successive angular velocities of the screw.

If a reversal of direction is detected in step E102, monitoring boolean 'bool_inv' is set to 1 and a current angular position $\theta_0$ of screw 12 at this instant is stored in memory (step E104). The routine then returns to test step E102 executed on the subsequent measurements of angular velocity of the screw.

Transducers for measuring the angular velocity/position of screw 12 are traditionally known to the person skilled in the art. The objective of the angular position stored in memory is to constitute a reference in the continuing estimation of the angular displacement of the screw for purposes of knowing whether this is greater than the free play of no-back device 16 since the reversal of direction.

To achieve this, if no reversal of direction is detected in step E102, the difference between the current angular position θ of screw 12 and the reference angular position $\theta_0$ is compared with the value of the free play of no-back device 16 (step E106).

If the difference is greater than the free play, monitoring boolean 'bool_inv' is then set to 0 (step E108), in order to indicate that operation is no longer taking place within the free play of the no-back device. This branch of the routine is also followed when monitoring boolean 'bool_inv' is equal to 0, thus indicating no difficulty.

The routine then returns to step E102 to process the subsequent measurements of angular velocity.

If the difference is smaller than the free play of no-back device 16 (output NO of test E106), the routine returns directly to step E102. This branch of the routine may be followed when bool_inv=1. In this case, the boolean is maintained at the same value, as long as the amplitude of movement counted from the instant at which the reversal of direction occurred has not exceeded the value of the free play of "no-back brake" device 16.

This branch of the routine may also be followed when bool_inv=0. In this case there is no difficulty, since no inhibition of the detection has occurred.

Figure 9:
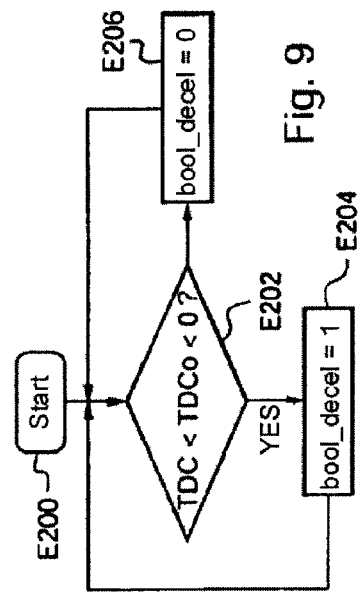
FIG. 9 represents, in the form of a schematic diagram, steps for determining an indicator of rapid deceleration of the actuator for the second embodiment.

Referring to FIG. 9, the second of the two conditions inhibits the detection of a failure as soon as the actuator is subjected to a rapid deceleration, likely to introduce a braking resistance by the "motor brake" effect. This effect is widely known to the specialist in motor mechanics.

In fact, in the case of a "motor brake", the motor receives energy and therefore flips to a mode of negative mechanical work produced, whereas the actuator as a whole remains operational and unimpaired.

A routine for monitoring of the deceleration is then provided in monitoring logic 50. This routine is also executed in parallel with the processing steps of FIG. 6, and provides, after a starting step E200, a step of testing the current deceleration rate TDC (step E202). By way of illustration, the deceleration rate is equal to the variation of the velocity $V_m$ of the motor between the current calculation interval and the preceding calculation interval. It is noted that the variation is negative in the case of deceleration and positive in the case of acceleration.

Test E202 consists in comparing this variation with a threshold rate $TDC_0$, which is negative, in order to take into account the deceleration character. Nevertheless, any other sign convention may be adopted.

In the case in which $TDC<TDC_0$, or in other words when the amplitude (in absolute value) of deceleration is greater than the threshold amplitude, the corresponding monitoring boolean, denoted by 'bool_decel', is set to 1 (step E204). Then the routine returns to step E202 in order to proceed to the test with the measurements of velocity $V_m$ in the next calculation interval.

If $TDC \geq TDC_0$ (no large deceleration), the boolean 'bool_decel' is set to (or maintained at, depending on the case) 0 in order to indicate, in the processing operations of FIG. 6, that there is no inhibition of detection by reason of a rapid deceleration.

The foregoing examples are merely some embodiments of the invention, which is not limited thereto.

The invention claimed is:

1. A method for monitoring an actuator equipped with a no-back device, comprising:
   detecting reversal of a direction of movement of the actuator;
   storing in memory, when reversal of the direction of movement of the actuator is detected, a current angular position as a reference angular position of the actuator;
   determining a value representative of mechanical work produced by the actuator;
   comparing the value representative of the mechanical work produced with ranges of values; and
   detecting dysfunctioning of the no-back device by the comparing,
   wherein detection of dysfunctioning is temporarily inhibited upon detecting reversal of the direction of movement of the actuator and as long as the angular displacement of the actuator remains within free play of the no-back device, and
   wherein a subsequent current angular position is compared with the reference angular position stored in the memory to determine when the angular displacement of the actuator remains within the free play of the no-back device.

2. The method according to claim 1, wherein the actuator includes a screw/nut assembly driven by a motor, and the determination of the value representative of the mechanical work includes a measurement of at least one physical value relating to the motor.

3. The method according to claim 2, wherein the actuator has a hydraulic channel, and the value representative of the mechanical work is determined from an algebraic velocity of the motor and an algebraic differential of hydraulic pressure at terminals of the motor.

4. The method according to claim 3, wherein the dysfunctioning of the no-back device is detected when the value representative of the mechanical work is of a given sign, and the algebraic hydraulic pressure differential and the algebraic velocity each has an absolute value greater than a corresponding threshold value.

5. The method according to claim 1, wherein detection of dysfunctioning is temporarily inhibited as a function of a parameter representative of a rate of deceleration of the actuator.

6. The method according to claim 1, wherein detection of dysfunctioning is a function of an algebraic sign of the value representative of the mechanical work produced.

7. The method according to claim 1, comprising a step of indicating a dysfunctioning of the no-back device when a dysfunctioning of the no-back device is detected for several consecutive determined values.

8. A system for monitoring an actuator equipped with a no-back device, comprising:
   a reversal detecting module to determine reversal of a direction of movement of the actuator;
   memory to store an angular position of the actuator, the memory storing a current angular position as a reference angular position of the actuator when reversal of the direction of movement of the actuator is detected;
   a determination module to determine a value representative of mechanical work produced by the actuator;
   a comparison module to detect dysfunctioning of the no-back device by comparing the value representative of the mechanical work produced with ranges of values; and
   a monitoring module to temporarily inhibit detection of dysfunctioning as a function of a parameter relating to reversal of the direction of movement of the actuator within free play of the no-back device,
   wherein a subsequent current angular position is compared with the reference angular position stored in the memory to determine when angular displacement of the actuator is greater than the free play of the no-back device.

9. The monitoring system according to claim 8, wherein the said actuator comprises a screw/nut assembly driven by a motor, and the determination module measures at least one physical value relating to the motor.

10. The monitoring system according to claim 9, wherein the actuator has a hydraulic channel, and the determination module determines the value representative of the mechanical work from an algebraic velocity of the motor and an algebraic differential of hydraulic pressure at terminals of the motor.

11. The monitoring system according to claim 10, wherein the monitoring system detects dysfunctioning of the no-back device when the value representative of the mechanical work is of a given sign, and the algebraic hydraulic pressure differential and the algebraic velocity each has an absolute value greater than a corresponding threshold value.

12. The monitoring system according to claim 8, wherein the monitoring module further inhibits detection of dysfunctioning temporarily as a function of a parameter representative of a rate of deceleration of the actuator.

13. The monitoring system according to claim 8, wherein the comparison module is configured to detect dysfunctioning as a function of an algebraic sign of the value representative of the mechanical work produced.

14. The monitoring system according to claim 8, further comprising an indicator to indicate a dysfunctioning of the no-back device when a dysfunctioning of the said no-back device is detected for several said consecutive determined values.

15. An aircraft comprising an actuator equipped with a no-back device and a system for monitoring the actuator according to claim 8.

16. A method for monitoring an actuator equipped with a no-back device, comprising:
   determining a value representative of mechanical work produced by the actuator;
   comparing the value representative of the mechanical work produced with ranges of values;
   detecting dysfunctioning of the no-back device by the comparing; and
   detecting a rate of deceleration of the actuator,
   wherein detection of dysfunctioning is temporarily inhibited upon detecting the rate of deceleration of the actuator having an amplitude of which is greater than a threshold amplitude and as long as the amplitude remains greater than the threshold amplitude.

17. The method according to claim 1, wherein detecting reversal of the direction of movement of the actuator is based on two successive angular velocities of the actuator.

* * * * *